(12) United States Patent
Morgan et al.

(10) Patent No.: US 11,003,415 B1
(45) Date of Patent: May 11, 2021

(54) AUDIO/VISUAL PRODUCTION SYSTEM FOR TRANSMITTING AUDIO-VIDEO SIGNALS AND MANAGING INTERRUPT SIGNALS WITH LOW LATENCY

(71) Applicant: New England Sports Network, Inc, Watertown, MA (US)

(72) Inventors: George Morgan, Watertown, MA (US); Jeffrey P. Cummings, Wayland, MA (US)

(73) Assignee: NEW ENGLAND SPORTS NETWORK, INC., Watertown, MA (US)

( * ) Notice: Subject to any disclaimer, the term of this patent is extended or adjusted under 35 U.S.C. 154(b) by 0 days.

(21) Appl. No.: 16/712,473

(22) Filed: Dec. 12, 2019

(51) Int. Cl.
*G06F 3/16* (2006.01)
*H04N 5/265* (2006.01)
*H04N 21/2187* (2011.01)
*H04N 21/233* (2011.01)
*H04N 21/422* (2011.01)

(52) U.S. Cl.
CPC ............ *G06F 3/165* (2013.01); *H04N 5/265* (2013.01); *H04N 21/2187* (2013.01); *H04N 21/233* (2013.01); *H04N 21/42203* (2013.01)

(58) Field of Classification Search
None
See application file for complete search history.

(56) References Cited

U.S. PATENT DOCUMENTS

| | | | | |
|---|---|---|---|---|
| 2009/0066846 | A1* | 3/2009 | Castle | H04N 5/28 348/722 |
| 2012/0320196 | A1* | 12/2012 | Overton | H04H 20/10 348/143 |
| 2013/0278786 | A1* | 10/2013 | Lundgren | H04N 5/28 348/211.3 |
| 2015/0293909 | A1* | 10/2015 | Scherrer | G10L 25/48 381/74 |

OTHER PUBLICATIONS

"Gemini Matrix on an OB Truck." Clear-Com, Feb. 15, 2018, www.clearcom.com/gemini-matrix-on-an-ob-truck/. (Year: 2018).*

* cited by examiner

*Primary Examiner* — James K Mooney
(74) *Attorney, Agent, or Firm* — Morgan, Lewis & Bockius LLP

(57) ABSTRACT

The present invention describes a method and system for transferring audio-video signals to a production center and managing communications between headsets, for example, within a multiprocessing system while minimizing delay.

10 Claims, 2 Drawing Sheets

200

202: receiving, from a first headset operated by a first user, a first headset audio signal 204: receiving, from a set of audio sources, a set of audio signals 206: receiving, from an external audio production source, a first interrupt signal 208: splitting the first interrupt signal into: a first key interrupt signal and a first local interrupt signal 210: transmitting the first local interrupt signal to a first line combiner 212: transmitting the first key interrupt signal to a noise gate 214: generating a first local headset mix signal representative of the set of audio signals 216: transmitting the first local headset mix signal to the noise gate 218: toggling between: transmitting the first local headset mix signal received from the mixer when the first key interrupt signal represents no intent by a producer at the external audio production source to interrupt the audio received at the first headset operated by the first user, and refraining from transmitting the first local head set mix signal from the mixer when the first key interrupt signal represents an intent by a producer at the external audio production source to interrupt the audio received at the first headset operated by the first user 220: combining the first local headset mix signal received from the noise gate and the local interrupt signal received from the mixer to generate a combined audio signal 222: transmitting the combined audio signal to the first headset operated by the first user

Fig. 2

AUDIO/VISUAL PRODUCTION SYSTEM FOR TRANSMITTING AUDIO-VIDEO SIGNALS AND MANAGING INTERRUPT SIGNALS WITH LOW LATENCY

BACKGROUND

Production systems for broadcasting live media events typically involve large production trucks positioned at the event location. These trucks contain the electrical and computing components necessary to produce a television broadcast viewed on televisions nationwide. Due to the sheer number of electrical and computing components, these trucks can be expensive and inefficient to operate. For example, in a baseball game, the production system requires a large production truck that may receive audio signals from the play-by-play announcer, color commentator, sideline reporter, camera, effects, etc. as well as communication systems to communicate between the announcer/commentator and the production team in the truck. The production truck processing the various audio, video, replay, transmission, and graphics require large amounts of space for the equipment needed to process the live event. Improvements have been attempted by other production systems by removing the truck and move all of the audio and video processing to the production center potentially hundreds of miles from the event location. However, to process the audio video signals and communicate with the announcer/commentator, a time delay may be experienced. It can be jarring to hear audio delay in the headsets of the announcer/commentator. The present invention describes a method and system for transferring audio-video signals to a production center and managing communications between the announcer/commentator and the production team within a multiprocessing system while minimizing delay.

BRIEF DESCRIPTION OF THE SEVERAL VIEWS OF THE DRAWINGS

The foregoing summary, as well as the following detailed description of embodiments of the interrupt signal management system, will be better understood when read in conjunction with the appended drawings of an exemplary embodiment. It should be understood, however, that the invention is not limited to the precise arrangements and instrumentalities shown.

In the drawings:

FIG. 2 illustrate a flowchart representation of an audio/video production method for transmitting audio-video signals and managing interrupt signals with low latency, according to some implementations.

DESCRIPTION OF THE IMPLEMENTATIONS

Figure 1:
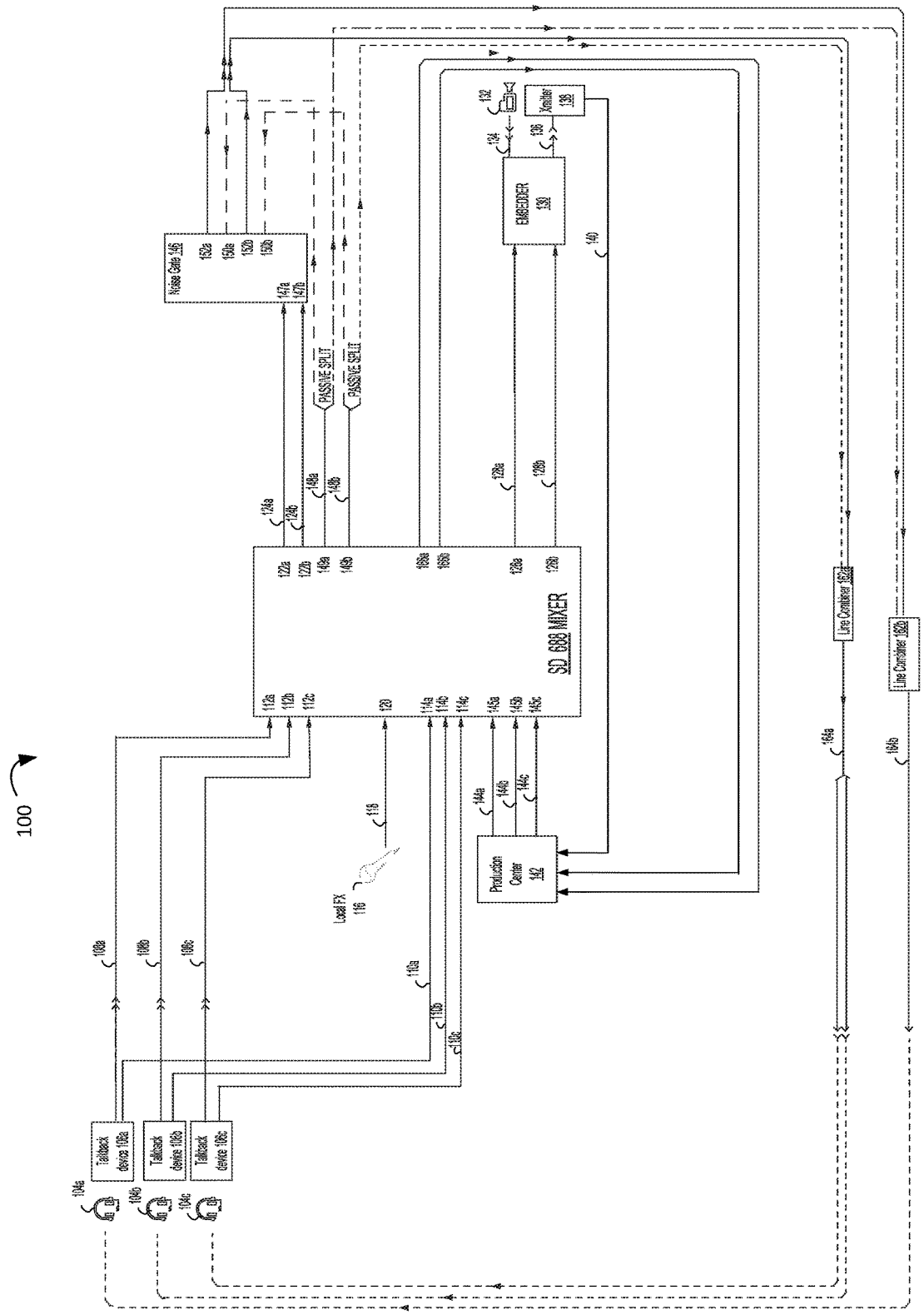
FIG. 1 is a circuit diagram of an audio/video production system for transmitting audio-video signals and managing interrupt signals with low latency, in accordance with an exemplary embodiment of the present invention.

Referring to the drawings in detail, wherein like reference numerals indicate like elements throughout, there, is shown in FIGS. 1-2, a signal management system, generally designated, in accordance with an exemplary embodiment of the present invention.

Referring to FIG. 1, there is shown an exemplary embodiment of the signal management system 100 representative of an audio/video production system for transmitting audio-video signals and managing interrupt signals with low latency. For ease of understanding, the signal management system 100 will be described with respect to broadcasting and producing a live sporting event, however, in alternative embodiments, the signal management system 100 may be used for other purposes.

The signal management system 100 may be positioned less than ten, five, two or one hundred yards from the live event. The signal management system 100 may be configured to receive audio and video signals from announcers, effects microphones and video cameras, process the audio and video signals and transmit the audio and video signals to a production center (not shown) while also providing mixed audio signals to the external sources (e.g., announcers' headsets) with minimal delay. The signal management system 100 may also be configured to receive and process audio signals from the production center to facilitate communication between the production center and the announcers with minimal delay.

The signal management system 100 may include a mixer SD_688 MIXER (hereinafter mixer SD_688). Mixer SD_688 may be configured to receive a number of signals from various audio sources and interrupt signals from one or more external audio production sources, mix the received audio signals and transmit these signals in combination with the video stream associated with the audio such that the audio signals and interrupt signals are effectively managed, while mitigating delay, in a media event or broadcast.

The signal management system 100 may include one or more headsets 104. Headset 104*a* may be used by a play-by-play announcer. Headset 104*b* may be used by a color commentator. Headset 104*c* may be a spare headset. One or more headsets 104 may include a microphone configured receive sound from the user or environment to produce an audio signal. One or more headsets 104 may include earcups to receive sound from an external source.

The signal management system 100 may include one or more talkback devices 106. One or more of the audio signals from a respective headset 104 may be received by one or more talkback devices 106. The talkback devices 106 may be configured to toggle between transmitting the received audio signal over a first talkback device line 108 (also referred to herein as an audio signal 108) or a second talkback device line 110 (also referred to herein as a talkback signal 110) in response to a user input. The audio signal 108 is transmitted to microphone inputs 112 of mixer SD_688 and may ultimately be used for further audio signal mixing and transmission in the (on air) audio/video broadcast signal transmitted to the production center 142. The talkback signal 110 may be transmitted to microphone inputs 114 of mixer SD_688 and transmitted at output 166*b* to production center 142 (described in more detail below) to allow the announcers to communicate with the producers off-air at production center 142. The talkback device line 108 may be transmitted to microphone inputs 112 of mixer SD_688 and transmitted at output 166*a* to production center 142 (described in more detail below) to provide backup feeds to production center 142. In some embodiments, signals output from output 166*a-b* may be utilized as backup audio signals for communication between the announcers and producers at production center 142.

The signal management system 100 may include a local effects microphone(s) 116. The local effects microphone(s) 116 may be configured to receive environmental sounds from the live event and generate a local effects audio signal 118 or in some embodiments, multiple local effects audio signals 118. The local effects audio signal 118 may be transmitted to and received by mixer SD_688 at input 120, or in some embodiments where there are multiple local effects microphones, input 120 may correspond to multiple inputs. Examples of environmental sounds may include crowd noise, fireworks, the crack of a bat hitting a ball, or a football tackle.

After receiving the one or more audio input signals, the mixer SD_688 may generate a partially mixed audio signal 128a-b representative of at least some of the audio input signals and output the partially mixed audio signal at outputs 126a-b. In some embodiments, the partial mixed audio signals 128a-b may each be representative of individual headsets, talkback, wireless or other individual channels within the system. The mixer SD_688 may transmit the fully mixed audio signal 128a-b to an embedder 130 that combines the fully mixed audio signal 128a-b with a video signal 134 from a video camera 132 to produce an audio/video broadcast signal 136. The embedder 130 transmits the audio/video broadcast signal 136 to a transmission system 138 for further transmission to external sources (e.g., production center 142). The transmission system 138 may transmit the audio/video broadcast signal 136 over wired or wireless transmission mediums, such as cable, satellite or cellular systems.

The signal management system 100 may include a production center 142 that may be located more than one, two, five, ten, fifty, one hundred, or one-thousand plus miles from the live event. The production center 142 may be configured to receive the transmitted audio/video broadcast signal 140 from the transmission system 138 to process the transmitted audio/video broadcast signal 140 to distribute to consumers.

At different points during the live event, a producer at the production center 142 may desire to speak to one of the announcers at the live event. The producer may speak into a microphone at the production center 142 and select which announcer is to receive the audio signal from the producer. Audio interrupt signal 144a may represent the audio signal of the producer from the production center 142 when the producer desires to speak to the play-by-play announcer at headset 104a. Audio interrupt signal 144b may represent the audio signal of the producer from the production center 142 when the producer desires to speak to the color commentator at headset 104b. At different points during the live event, a producer at the production center 142 may desire to play short segment of electronic media with an audio component for consumers. The producer may also desire that the play-by-play announcer at headset 104a and the color commentator at headset 104b hear the audio from the electronic media (e.g., a highlight reel or a commercial) being played. Audio interrupt signal 144c may represent the audio component of the electronic media. The audio interrupt signals 144 may be transmitted from the production center 142 via telephone, cellular and/or satellite systems, among others. The mixer SD_688 may be configured to receive the audio interrupt signals 144a-c and optionally electronic media signals at inputs 145a-c.

The mixer SD_688 may generate a first local headset mix signal 124a and a second local headset mix signal 124b at outputs 122a-b respectively. The first local headset mix signal 124a may be a mix of audio input signals received at the mixer SD_688 For example, first local headset mix signal 124a may include audio signal 108a from headset 104a, audio signal 108b from headset 104b, audio signal 108c from headset 104c and local effects audio signal 118 from the local effects microphone 116, among others including wireless signals such as a wireless sideline signal. The first local headset mix signal 124a is eventually returned back to the headset 104a. The second local headset mix signal 124b may be a mix of audio input signals received at the mixer SD_688 For example, second local headset mix signal 124b may include audio signal 108a from headset 104a, audio signal 108b from headset 104b, audio signal 108c from headset 104c and local effects audio signal 118 from the local effects microphone 116, among others. The second local headset mix signal 124b is eventually returned back to the headset 104b (and 104c).

The signal management system 100 may include interrupt circuitry to allow a producer at the production center 142 to communicate with one or more announcers at the live event. The interrupt circuitry may include an audio-operated switch 146. In some embodiments, the audio-operated switch may be a voice-operated switch or noise gate. The audio-operated switch 146 may refer to an electronic device or software configured to control the volume of an audio signal or even cut off an audio signal for further transmission to allow another audio signal to pass to the headsets 104.

The mixer SD_688 may transmit the first local headset mix signal 124a and/or second local headset mix signal 124b to inputs 147a-b, respectively of the audio-operated switch 146 which is electrically coupled to the headsets 104a-c.

The mixer SD_688 may control whether the local headset mix signals 124a-b eventually return to the headset by using interrupt signals. For example, the mixer SD_688 may be configured to generate first and second output audio interrupt signals 148a-b at outputs 149a-b of mixer SD_688. The first and second output audio interrupt signals 148a-b may be representative of audio interrupt signals 144a-b respectively. The first output audio interrupt signal 148a may be an interrupt signal for the first headset 104a. The first output audio interrupt signal 148a may be audio interrupt signal 144a. The second output audio interrupt signal 148b may be an interrupt signal for the second headset 104b. The second output audio interrupt signal 148b may be audio interrupt signal 144b.

The mixer SD_688 may transmit first and second output audio interrupt signals 148a-b to the audio-operated switch 146 at sidechain inputs 150a-b. The audio-operated switch 146 may be configured to pass through the first local headset mix signal 124a at output 152a of the audio-operated switch 146 if the first output audio interrupt signal 148a is inactive. The audio-operated switch 146 may be configured to refrain from passing through the first local headset mix signal 124a at output 152a of the audio-operated switch 146 if the first output audio interrupt signal 148a is active. The audio-operated switch 146 may be configured to pass through the second local headset mix signal 124b at noise gate output 152b of the audio-operated switch 146 if the second output audio interrupt signal 148b is inactive. The audio-operated switch 146 may be configured to refrain from passing through the second local headset mix signal 124b at output 152b of the audio-operated switch 146 if the first output audio interrupt signal 148b is active.

The interrupt circuitry may allow a producer at the production center 142 to communicate with one or more announcers at the live event may also include one or more line combiners 162. The line combiner 162a may be configured to receive first local headset mix signal 124a at output 152a of the audio-operated switch 146 and first output audio interrupt signal 148a and produce a combined output signal 164a for transmission to the headset 104a. The line combiner 162b may be configured to receive second local headset mix signal 124b at output 152b of the audio-operated switch 146 and second output audio interrupt signal 148b and produce a combined output signal 164b for transmission to the second headset 104*b* and optional headset 104*c* (e.g., the spare headset).

In conjunction with the audio-operated switch 146 and mixer SD_688, the line combiners 162*a-b* functions to downmix the local audio signals with the remote interrupt signal into a single signal line, thereby allowing a producer at the production center 142 to communicate with one or more announcers at the live event with minimal delay in audio signal received at the headsets 104 of the announcers.

FIG. 2 depicts a flowchart of an audio/video production method 200 for transmitting audio-video signals and managing interrupt signals with low latency, in accordance with at least one embodiment of the invention. Method 200 may be performed by one or more components of the signal management system 100.

The mixer (e.g., mixer SD_688) receives (202), from a first headset (e.g., headset 104*a*) operated by a first user, a first headset audio signal (e.g., audio signal 108*a*).

The mixer receives (204), from a set of audio sources, a set of audio signals (e.g., audio signals 108*b-c* and local effects audio signal 118).

The mixer receives (206), from an external audio production source (e.g., production center 142), a first interrupt signal (e.g., audio interrupt signal 144*a*).

The mixer splits (208) the first interrupt signal into: a first key interrupt signal (e.g., signal input into input 150*a* of audio-operated switch 146) and a first local interrupt signal (signal input into line combiner 162*a*);

The mixer transmits (210) the first local interrupt signal to a first line combiner (e.g., line combiner 162*a*);

The mixer transmits (212) the first key interrupt signal to an audio-operated switch (e.g., audio-operated switch 146);

The mixer generates (214) a first local headset mix signal representative of the set of audio signals.

The mixer transmits (216) the first local headset mix signal to the audio-operated switch, The audio-operated switch switches (218) between: transmitting the first local headset mix signal received from the mixer when the first key interrupt signal indicates/represents (e.g., when the first key interrupt signal is not present) no intent by a producer at the external audio production source to interrupt the audio received at the first headset operated by the first user, and refraining from transmitting the first local head set mix signal from the mixer when the first key interrupt signal indicates/represents (e.g., when the first key interrupt signal is present) an intent by a producer at the external audio production source to interrupt the audio received at the first headset operated by the first user.

The line combiner combines (220) the first local headset mix signal received from the audio-operated switch and the local interrupt signal received from the mixer to generate a combined audio signal (e.g., combined output signal 164*a*).

The line combiner transmits (222) the combined audio signal to the first headset operated by the first user.

In some embodiments, the set of audio sources includes at least one or more of a second headset, mixed microphone, telephone, and a mobile telephone.

In some embodiments, the first key interrupt signal includes audio from the external audio production source during select periods of time.

In some embodiments, the first key interrupt signal indicates an intent by a producer at the external audio production source to interrupt the audio received at the first headset operated by the first user includes audio from the external audio production source.

In some embodiments, the first local interrupt signal includes audio from the external audio production source.

In some embodiments, the set of audio signals includes a second headset audio signal (e.g., audio signal 108*b*) from a second headset (e.g., headset 104*a*). In some embodiments, the mixer may receive, from the second headset operated by a second user, the second headset audio signal. In some embodiments, the mixer may receive, from the external audio production source, a second interrupt signal (e.g., audio interrupt signal 144*b*). In some embodiments, the mixer splits the second interrupt signal into: a second key interrupt signal and a second local interrupt signal. In some embodiments, the mixer transmits the second local interrupt signal to a second line combiner (e.g., line combiner 162*b*). The mixer transmits the second key interrupt signal to the audio-operated switch. In some embodiments, the mixer generates a second local headset mix signal (e.g., second local headset mix signal 124*b*) representative of the set of audio signals. In some embodiments, the mixer transmits the second local headset mix signal to the audio-operated switch. In some embodiments, the audio-operated switch toggles between: transmitting the second local headset mix signal received from the mixer when the second key interrupt signal indicates no intent by a producer at the external audio production source to interrupt the audio received at the second headset operated by the second user, and refraining from transmitting the second local head set mix signal from the mixer when the second key interrupt signal indicates an intent by a producer at the external audio production source to interrupt the audio received at the second headset operated by the second user. In some embodiments, the second line combiner combines the second local headset mix signal received from the audio-operated switch and the local interrupt signal received from the mixer to generate a combined audio signal (e.g., combined output signal 164*b*). In some embodiments, the second line combiner transmits the combined audio signal to the second headset operated by the second user.

In some embodiments, the mixer receives a talkback signal (e.g., talkback signal 110) generated at the first headset in response to a user input at the headset, In some embodiments, the mixer transmits the talkback signal to an external audio production source (e.g., production center 142).

In some embodiments, the talkback signal generated at the first headset is separate from the first headset audio signal.

In some embodiments, the mixer combines the set of audio signals and the first headset audio signal to form a combined audio signal (e.g., first local headset mix signal 124*a*). In some embodiments, the mixer transmits to an embedder (e.g., embedder 130) the combined audio signals. In some embodiments, the embedder embeds the combined audio signal with a video signal (e.g., video signal 134). In some embodiments, the embedder transmits the audio/video signal to the external audio production source.

In one embodiment, the signal management system 100 includes one or more computers having one or more processors and memory (e.g., one or more nonvolatile storage devices). In some embodiments, memory or computer readable storage medium of memory stores programs, modules and data structures, or a subset thereof for one or more processors to control and run one or more of the various systems, functions, and methods disclosed herein. In one embodiment, a non-transitory computer readable storage medium having stored thereon computer-executable instructions which, when executed by a processor, perform one or more of the methods disclosed herein. In some embodiments, one or more of the various systems, functions, and methods disclosed herein may be implemented via hardware, firmware, software or any combination thereof. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover, for example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A method of transferring audio-video signals and managing interrupt signals within a multiprocessing system, the method comprising the steps of:
    at a mixer:
        receiving, from a first headset operated by a first user, a first headset audio signal;
        receiving, from a set of audio sources, a set of audio signals;
        receiving, from an external audio production source, a first interrupt signal;
        splitting the first interrupt signal into:
            a first key interrupt signal and
            a first local interrupt signal;
        transmitting the first local interrupt signal to a first line combiner;
        transmitting the first key interrupt signal to an audio-operated switch;
        generating a first local headset mix signal representative of the set of audio signals;
        transmitting the first local headset mix signal to the audio-operated switch,
    at the audio-operated switch:
        toggling between:
            transmitting the first local headset mix signal received from the mixer when the first key interrupt signal represents no intent by a producer at the external audio production source to interrupt the first headset audio signal received at the first headset operated by the first user, and
            refraining from transmitting the first local head set mix signal from the mixer when the first key interrupt signal represents an intent by the producer at the external audio production source to interrupt the first headset audio signal received at the first headset operated by the first user;
    at the line combiner:
        combining the first local headset mix signal received from the audio-operated switch and the local interrupt signal received from the mixer to generate a combined audio signal; and
        transmitting the combined audio signal to the first headset operated by the first user.

2. The method of claim 1, wherein the set of audio sources includes at least one of a second headset, mixed microphone, telephone, video return, and a mobile telephone.

3. The method of claim 1, wherein the first key interrupt signal includes audio from the external audio production source during select periods of time.

4. The method of claim 1, wherein the first key interrupt signal indicates an intent by the producer at the external audio production source to interrupt the audio received at the first headset operated by the first user and includes audio from the external audio production source.

5. The method of claim 1, wherein the first local interrupt signal includes audio from the external audio production source.

6. The method of claim 1, wherein the set of audio signals includes a second headset audio signal from a second headset;
    at the mixer:
        receiving, from the second headset operated by a second user, the second headset audio signal;
        receiving, from the external audio production source, a second interrupt signal;
        splitting the second interrupt signal into:
            a second key interrupt signal and
            a second local interrupt signal;
        transmitting the second local interrupt signal to a second line combiner;
        transmitting the second key interrupt signal to the audio-operated switch;
        generating a second local headset mix signal representative of the set of audio signals;
        transmitting the second local headset mix signal to the audio-operated switch,
    at the audio-operated switch:
        toggling between:
            transmitting the second local headset mix signal received from the mixer when the second key interrupt signal represents no intent by the producer at the external audio production source to interrupt the second headset audio signal received at the second headset operated by the second user, and
            refraining from transmitting the second local head set mix signal from the mixer when the second key interrupt signal represents an intent by the producer at the external audio production source to interrupt the second headset audio signal received at the second headset operated by the second user;
    at the second line combiner:
        combining the second local headset mix signal received from the audio-operated switch and the local interrupt signal received from the mixer to generate a combined audio signal; and transmitting the combined audio signal to the second headset operated by the second user.

7. The method of claim 1, further comprising:
at the mixer:
receiving a talkback signal generated at the first headset in response to a user input at the headset,
transmitting the talkback signal to the external audio production source.

8. The method of claim 7, wherein the talkback signal generated at the first headset is separate from the first headset audio signal.

9. The method of claim 1, further comprising:
at the mixer:
combining the set of audio signals and the first headset audio signal to form the first local headset mix signal,
transmitting to an embedder the first local headset mix signal;
at the embedder:
embedding the first local headset mix signal with a video signal, and
transmitting to the external audio production source.

10. A system for transferring audio-video signals and managing interrupt signals within a multiprocessing system, the system comprising:
a mixer configured to:
receive, from a first headset operated by a first user, a first headset audio signal;
receive, from a set of audio sources, a set of audio signals;
receive, from an external audio production source, a first interrupt signal;
split the first interrupt signal into:
a first key interrupt signal and
a first local interrupt signal;
transmit the first local interrupt signal to a first line combiner;
transmit the first key interrupt signal to an audio-operated switch;
generate a first local headset mix signal representative of the set of audio signals;
transmit the first local headset mix signal to the audio-operated switch, the audio-operated switch configured to:
toggle between:
transmit the first local headset mix signal received from the mixer when the first key interrupt signal represents no intent by a producer at the external audio production source to interrupt the first headset audio signal received at the first headset operated by the first user, and
refrain from transmitting the first local head set mix signal from the mixer when the first key interrupt signal represents an intent by the producer at the external audio production source to interrupt the first headset audio signal received at the first headset operated by the first user;
the line combiner configured to:
combine the first local headset mix signal received from the audio-operated switch and the local interrupt signal received from the mixer to generate a combined audio signal; and
transmit the combined audio signal to the first headset operated by the first user.

\* \* \* \* \*